United States Patent [19]
Scott

[11] Patent Number: 4,754,551
[45] Date of Patent: Jul. 5, 1988

[54] CENTERING GAUGE TOOL

[75] Inventor: Jimmie D. Scott, Harrison, Tenn.

[73] Assignee: Spencer Wright Industries, Inc., Dalton, Ga.

[21] Appl. No.: 104,513

[22] Filed: Sep. 29, 1987

Related U.S. Application Data

[63] Continuation of Ser. No. 863,740, May 16, 1986, abandoned.

[51] Int. Cl.$^4$ ............................ G01B 3/26; G01B 5/12
[52] U.S. Cl. ................... 33/169 C; 33/178 E; 33/178 F; 33/543; 33/520; 33/550
[58] Field of Search ............ 33/169 C, 178 R, 178 E, 33/178 F, 149 B, 149 J, 520, 531, 542, 543, 544, 147 K, 162, 558, 559, 561, 172 D, 172 E, 550, 504

[56] References Cited

U.S. PATENT DOCUMENTS

| | | | |
|---|---|---|---|
| 2,340,987 | 2/1944 | Robidoux | 33/178 F |
| 2,497,990 | 2/1950 | Huber et al. | 33/178 F |
| 2,630,632 | 3/1953 | Brandon | 33/178 F |
| 3,772,794 | 11/1973 | Hopler, Jr. | 33/178 F |
| 4,112,355 | 9/1978 | Gibson, Jr. et al. | 33/504 |
| 4,186,494 | 2/1980 | Edouard et al. | 33/178 F |
| 4,306,455 | 12/1981 | Selleri | 33/178 F |
| 4,443,948 | 4/1984 | Reeves | 33/178 F |

FOREIGN PATENT DOCUMENTS 1024695 6/1983 U.S.S.R. ............................ 33/178 E

Primary Examiner—William A. Cuchlinski, Jr.
Assistant Examiner—Patrick R. Scanlon
Attorney, Agent, or Firm—Alan Ruderman

[57] ABSTRACT

A centering gauge tool for determining if an axial bore is disposed concentrically relative to a desired center. The tool preferably has four sensing fingers equally spaced about a conical core, the finger being resiliently biased away from the surface of the core and depressible against the resilient urging into engagement with an electrical contact member connected in a circuit with lights and a source of electrical energy. When the tool is inserted within the bore of a workpiece and the bore is concentric about the axis of the workpiece relative to axes the tool, all of the indicator fingers will be depressed substantially simultaneously to light all the indicators. If the bore is eccentric, when the tool is inserted within the bore less than all the fingers will engage the wall of the bore and effect a lighting of less than all the indicators. An operator may thereafter provide correction of either the workpiece or a machine tool in which the centering gauge tool may be mounted to correct for the eccentricity. Preferably the indicator lights are of different colors thereby to indicate which finger or fingers have been depressed by contact with the wall of a bore.

20 Claims, 1 Drawing Sheet

CENTERING GAUGE TOOL

This is a continuation of application Ser. No. 863,740 filed May 16, 1986 and now abandoned.

BACKGROUND OF THE INVENTION

This invention relates to a gauge or tool for determining the concentricity of a bore in a workpiece about a desired axis, and more particularly to a tool of this type which may simply and accurately determine when such a bore is off-center or eccentric and in the direction in which the axis of the bore is off-set.

In the manufacture of cylindrical bores in workpieces it is difficult to precisely determine whether the center of the bore is precisely located even if the bore is perfectly cylindrical. This is especially true in remanufacturing operations. For example, when an engine block is rebored, not only must the cylinders be precisely disposed but so too must the bore for the crankshaft and cam shaft. Merely reboring the hole truly cylindrical is insufficient; the axis of the hole must be accurately disposed or the parts when assembled may run eccentrically and wobble. The alignment of the axis of the center of the bore to obtain precise concentricity about the desired location is difficult and time consuming even for the most skilled machinist. To a large degree this involves experience and guess work or expensive jigs which precisely hold the workpiece and the boring tool. While such equipment may be cost effective when manufacturing the workpieces initially in large production operations, e.g., engine blocks, the cost for remanufacturing and for smaller quantities generally is not justified and if the precision is not obtained the work is scraped.

The prior art has not developed a satisfactory solution to this problem. In fact, the known prior art does not even appear to have directly addressed it. In none of the known prior art can the center of the bore be located so that a boring tool may be precisely located for boring or reboring the hole. Moreover, in none of the known prior art can a relatively inexperienced operator readily determine the position where the tool or the workpiece should be disposed for obtaining a bore concentric about a desired axis.

U.S. Pat. No. 2,883,758 of Zelnick proposes a device having four fingers spaced 90° apart extending outwardly from the device and biased inwardly by springs so as to adjustably engage the wall of a bore to read variations in the radius thereof. In Zelnick there is a proposal to rotate the device through substantially 90° after the fingers are moved into engagement with the walls of the bore. If the bore is symmetrical about its longitudinal axis, the tool can be rotated, otherwise not.

In Blankinship U.S. Pat. No. 4,530,161 pivotable spring biased feelers engage the bore of a pipe and the pivotal motion of the feelers are converted into linear positions which are converted into electrical signals.

In Mizuno et al. U.S. Pat. No. 4,288,924 the internal diameter of a bore is measured by levers which are initially squeezed together for insertion into the hole and biased outwardly to engage the wall of the hole, the position of the levers providing a reading of the diameter of the bore.

In Edouard et al. U.S. Pat. No. 4,186,494 bore dimension measurements are made by spring biased feelers disposed about a central frame, the feelers contacting the walls of the bore to be measured and the positions determined and converted into electrical signals.

In U.S. Pat. No. 4,251,921 of Fink a tool having caliper and collapsible arms independently extend and retract as the tool is pulled through a bore hole to log the variations in the bore hole.

In Jandera et al. U.S. Pat. No. 4,342,225 a plurality of pivoted arms engage the inside of a flexible member which engages the wall of a pipeline, movement of the arms signal variations in the pipeline bore size.

Price et al. U.S. Pat. No. 2,908,085 discloses an instrument for measuring the internal surface of a pipe or the like by means of feelers connected to position the core of differential transformers for obtaining the reading of the size of the bore.

In Koltgen U.S. Pat. No. 4,211,014 a bore inspecting gauge has radially extending pins which merely convert the position of the pins into a gauge reading to determine the diameter of the bore.

SUMMARY OF THE INVENTION

Consequently, it is a primary object of the present invention to provide a simple centering gauge tool which accurately determines the concentricity of a hole about a desired central axis and provides an indication as to the direction in which a boring tool or the work must be moved in order to obtain precise concentricity.

It is another object of the present invention to provide a centering gauge tool for determining whether the walls of a bore are disposed concentrically about a correct central axis, the tool having a plurality of sensors and indicator means associated therewith to provide a readable signal as to portions of the wall of the bore which are not disposed concentrically about the desired central axis.

Accordingly, the present invention provides a centering tool for determining if an axial bore is disposed along the correct center line, the tool having sensors inserted into the bore for providing corresponding signals to indicators which readily provide a determination as to the concentricity of the bore about the center line and, if off-set, the direction in which correction must be made to form the walls of the bore concentrically about the center line.

More specifically, the centering tool comprises a set of sensors equally spaced in tapered disposition about a support member, the sensors being electrically connected to a corresponding set of indicators for providing a readable signal. The support member may be mounted in the chuck of a machine tool along an axis corresponding to the desired center line of the bore and inserted into the bore of the workpiece. If the bore is properly centered all the sensors are activated substantially simultaneously and provide a corresponding signal. If the bore is off center one or more of the sensors, but not all, will be activated to provide signals indicating the direction of off-set.

Structurally, a conical core member is fitted with four fingers equally spaced 90° apart about the periphery of the core and biased outwardly therefrom, the fingers being pivotably hinged at the leading end to a truncated leading end of the core and having respective switch closing means at the trailing end for closing a respective circuit. Engagement of all the fingers with the walls of the bore within which the tool is inserted closes all the circuits and engagement of less than all the fingers closes less than all the circuits. Upon closure of any circuit a signal is provided, such signal preferably being a visual signal indicative of the finger or fingers which have contacted the wall of the bore. Preferably the visual signals are lights, each light being a different color. The tool may be made substantially "idiot proof" by coloring the fingers with colors corresponding to the lights so that the operator merely may note which lights are lit and, if less than all are lit, he merely adjusts the axis of the machine tool chuck or workpiece in the direction or directions indicated.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
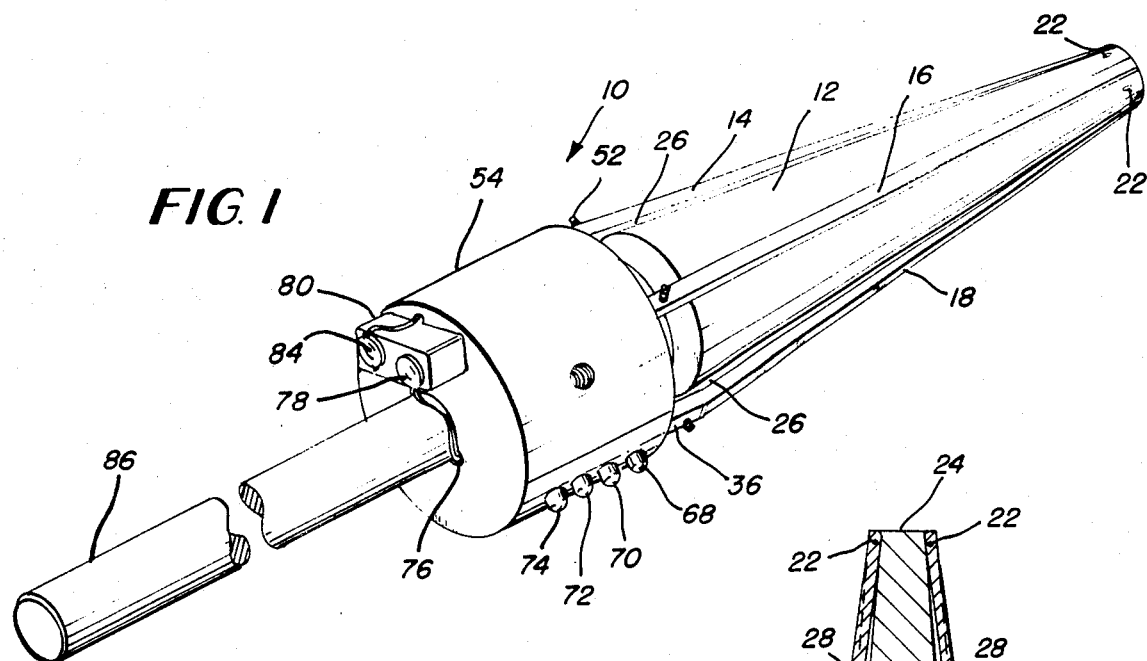
FIG. 1 is a perspective view of a centering gauge tool constructed in accordance with the principles of the present invention as viewed from the trailing end.

Referring to the drawings, a centering gauge tool 10 is illustrated comprising a conical core 12 about the periphery of which a plurality of elongated sensing fingers, preferably four, 14, 16, 18, 20 are disposed in equally spaced relationship, 90° apart in the preferred instance. In the embodiment illustrated in FIGS. 1 through 3, the core 12 comprises a metallic material such as steel and the fingers are metallic fingers pivotably hinged on journal pins 22 at the leading end of the core which is truncated at 24 for this purpose. Each of the fingers 14, 16, 18, 20 has a substantially rectangular cross sectional configuration and the core 12 is formed with elongated peripheral slots such as 26 for receiving the fingers 14, 16, 18, 20 as they are forced toward the axis of the core when contacting the walls of a bore within which the tool is inserted.

A substantially radially extending recess 28 is formed in each slot 26 for receiving a small coil spring 30 which acts to bias a respective finger 14, 16, 18, 20 radially outwardly from the surface of the core. The peripheral surface of the conical core adjacent the rear or trailing end thereof may be stepped downwardly at 32 to form a substantially cylindrical extension 34 of the conical core, the fingers 14, 16, 18, 20 having a length such as to overlay the surface of the extension 34 and preferably includes a bend at 36 so that when recessed into the slots 26 the lower surfaces of the fingers are substantially parallel to the cylindrical surface of the extension 34. A modification of this construction is to form the cylindrical extension 34 as a separate cylindrical ring and threadily or otherwise connect it to the rear of the conical core. In either event the cylindrical portion 34 includes a hollow bore 38 or the like within which wiring connections 40 may be placed for purposes hereinafter described.

Disposed on the surface of the cylindrical portion 34 directly beneath each finger 14, 16, 18, 20 is a respective switch contact means 42 which may be microswitches or the like. However, since except for costly units microswitches do not tend to make and break contact at exactly the same instant each time they are activated, it is preferred to utilize a simple electrical conductor in the form of a tungsten carbide rod 44 such as a welding rod. Each contact rod 44 is held in place on the surface of the portion 44 by a small amount of non-conductive bonding material such as epoxy 46 and extends into a hole 48 communicating with the bore 38. An electrical lead 50 extends from the end of the contact rod 44 into the bore 38 for connection to the wiring connections 40. Threadily disposed in each finger for engagement with a respective contact rod 44 is a set metallic screw 52 or the like. Thus, when a respective finger is pushed into the slot 26 against the bias of its spring 30, the screw 52 may contact the respective rod 44, the screw 52 acting as the second element of the switching means.

Positioned about the rear of the cylindrical portion 34 and fastened thereto by a set screw or the like is an indicating ring 54, the ring being spaced from the electrical contact members 44, 52 and being undercut at its leading face 56 to form a peripheral lip or ledge 58. The fingers 14, 16, 18, 20 are received within the undercut portion of the ring 54 and the ledge 58 acts as a stop to limit their outward movement as urged by the springs 30.

Four radial bores 60, 62, 64, 66 respectively corresponding to one of the fingers 14, 16, 18, 20 are formed in the ring 54 and a corresponding LED or other small lamp 68, 70, 72, 74 is inserted into each bore. Wire leads extend through a longitudinal slot 76 in the ring 54 communicating with the bore 60, 62, 64, 66. One lead from each LED extends to the bore 38 and is connected to a respective rod 44 at the wiring connections 40 and another wire lead extends rearwardly to connect with one terminal 78, preferably the positive terminal, of a small battery 80 such as a 9 volt dry cell or the like which is fitted into a recess 82 formed into the rear face of the ring 54. As illustrated, the indicating ring 54 preferably may comprise a plastic material to eliminate electrical shorting problems, but may be constructed of metal if desirable. The other terminal 84 of the battery 80 may be electrically connected to the rear of the core 12 which thereby places the entire core together with the fingers 14, 16, 18, 20 and the contact screws 52 at the same electrical potential as the terminal 84. Thus, whenever a contact screw 54 engages a contact rod 44 a circuit is closed between the battery 80 and the corresponding LED 68, 70, 72, 74 to signal the closure.

The rear end of the cylindrical portion 34 of the core is connected to an elongated cylindrical rod 86 which may be positioned within the chuck 88 of a machine tool spindle or the like, such as a boring machine. Thus, the center engaged tool 10 can be accurately disposed relative to the spindle of the machine tool and moved toward the work (not illustrated), the centering gauge tool being precisely located for use with the work.

A calibrating ring 90 may be disposed about the fingers 14, 16, 18, 20 and moved axially until at least one LED lights. At that time the contacting screws 52 are threaded into the fingers to the point where all the LED's light. Then, in use, when the tool 10 is inserted into the bore of a workpiece if all the LED's do not light at the same time, the bore of the workpiece is not concentric relative to the center of the bore. If only one LED lights, the spindle of the machine tool or the workpiece must be moved in the direction opposite to the finger corresponding to that light. The same is true any time less than all four LED's light. When all four LED's light at the same time, the bore being measured is concentric with its axis relative to the machine tool spindle.

To aid in determining the location of movement to obtain concentricity each LED is of a different color and each finger may be correspondingly colored. Thus, for example, if a red LED lights it is readily determined that the red finger engaged the wall of the bore and correction can be made rapidly.

Figure 3:
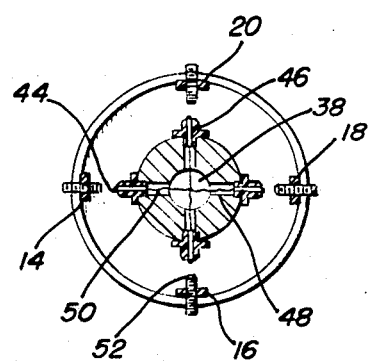
FIG. 3 is a cross sectional view taken substantially along line 3—3 of FIG. 2.
Figure 2:
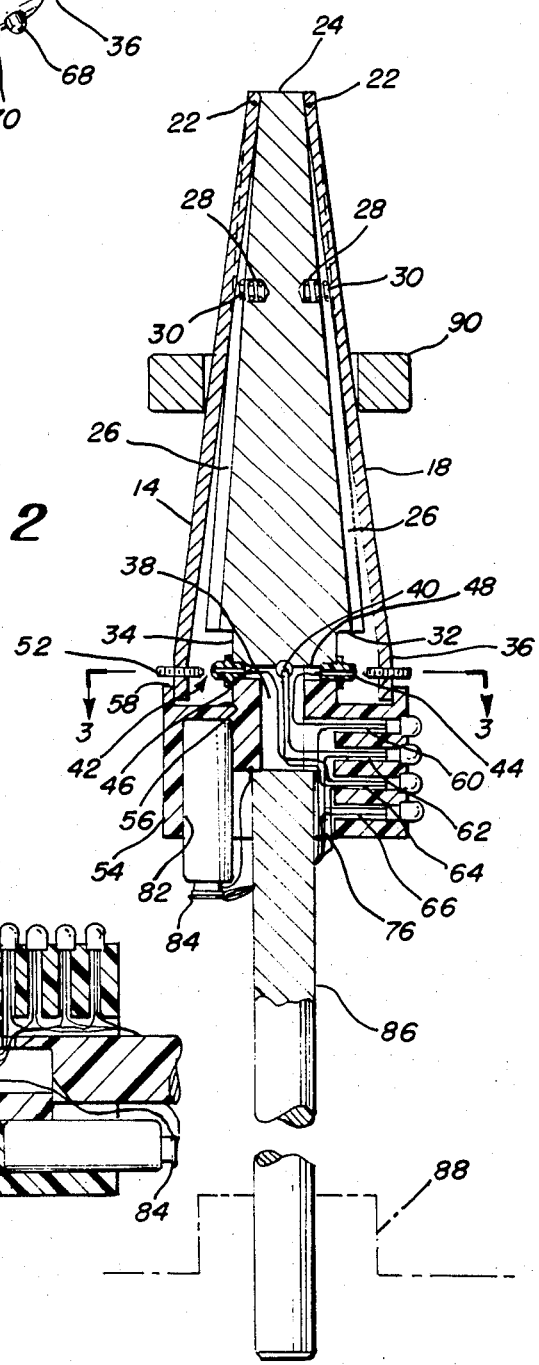
FIG. 2 is a longitudinal cross sectional view taken substantially through the center of the tool illustrated in FIG. 1 depicting the trailing end disposed in a chuck and the tool inserted through a calibrating ring.

To manufacture the fingers 14, 16, 18, 20 to the same contour as the conical core 12 in the embodiment of FIGS. 1 through 3, a ring may be disposed about the rear end of the fingers after they are pivotably connected at the front end to the core. A lathe may then turn the core and the fingers together to conform the surfaces of the fingers to the surface of the core.

Figure 4:
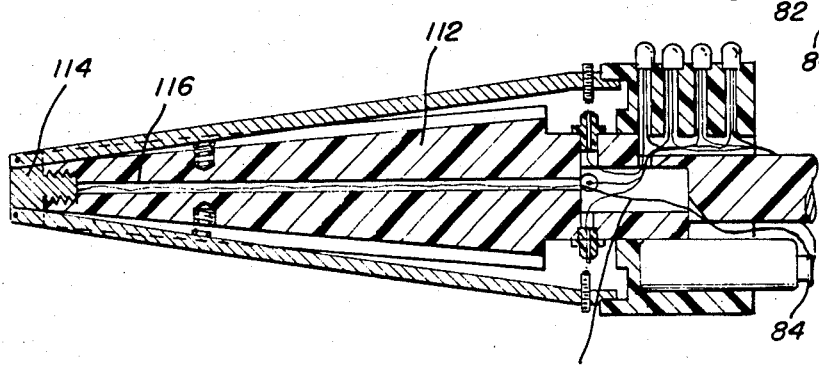
FIG. 4 is a view similar to FIG. 2 but of a tool constructed with a plastic core.

In the embodiment illustrated in FIG. 4, the core 112 may be constructed from plastic in which case a metal adapter 114 may be secured at the leading end, the fingers being pivotably connected to the adapter. Thus, since plastic is non-conducting, the core 112 would have a bore 116 extending longitudinally therethrough for receiving electrical wires 118 which connect to the terminal 84 of the battery 80. In either embodiment the fingers can also be constructed of plastic but in that case microswitches or the like would have to be utilized.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A centering gauge tool for determining the concentricity of a bore about a central axis, said tool comprising a substantially conical core having an axis of elongation and peirphery tapering from tail end to a leading end, a plurality of elongated fingers spaced apart about the periphery of said core, means for pivotably connecting said fingers to the core adjacent the leading end, resilient means for urging said fingers radially outwardly from the periphery of said core, stop means for limiting the radial outward travel of said fingers to the same radius relative to the axis of elongation of said core, normally open switch means associated with each finger adapted to be closed upon depression of the associated finger to overcome the urging of said resilient means, indicator means and a source of electrical energy connected in an electrical circuit with each of said switch means, the periphery of said core having a slot corresponding to each finger for receiving the respective finger when depressed, whereby upon insertion of said tool within a bore of a diameter less than a diameter defined by the radial outward travel of said fingers adjacent the tail end and larger than the leading end one or more of said indicator means will signal depression of the respective fingers upon engagement with the wall of the bore.

2. A centering gauge tool as recited in claim 1, wherein each of said indicator means comprises a visual means.

3. A centering gauge tool as recited in claim 2, wherein said visual means comprises illumination means.

4. A centering gauge tool as recited in claim 1, wherein said stop means comprises an annular member fastened to the tail end of said core about said fingers.

5. A centering gauge tool as recited in claim 1, including means fastened to the tail end of said core and adapted to be inserted into a chuck.

6. A centering gauge tool for determining the concentricity of a bore about a central axis, said tool comprising a substantially conical core having an axis of elongation and a periphery tapering from a tail end to a leading end, a plurality of elongated fingers spaced apart about the periphery of said core, means for pivotably connecting said fingers to the core adjacent the leading end, resilient means for urging said fingers radially outwardly from the periphery of said core, stop means for limiting the radial outward travel of said fingers to the same radius relative to the axis of elongation of said core, normally open switch means associated with each finger adapted to be closed upon depression of the associated finger to overcome the urging of said resilient means, an indicator ring fastened to the tail end of said core, said ring having means for mounting indicator means and a source of electrical energy, means for connecting said source of electrical energy is an electrical circuit with each of said switch means, whereby upon insertion of said tool within a bore of a diameter less than a diameter defined by the radial outward travel of said fingers adjacent the tail end and larger than the leading end one or more of said indicator means will signal depression of the respective fingers upon engagement with the wall of the bore.

7. A centering gauge tool as recited in claim 6, wherein each of said indicator means comprises a visual means.

8. A centering gauge tool as recited in claim 7, wherein said visual means comprises illumination means.

9. A centering gauge tool as recited in claim 6, wherein said stop means comprises an annular lip formed on said ring and disposed about said fingers.

10. A centering gauge tool as recited in claim 9, wherein each of said indicator means comprises a visual means.

11. A centering gauge tool as recited in claim 10, wherein said visual means comprises illumination means.

12. A centering gauge tool as recited in claim 11, including means fastened to the tail end of said core and adapted to be inserted into a chuck.

13. A centering gauge tool as recited in claim 6, wherein the periphery of said core comprises slots corresponding to each finger for receiving the respective finger when depressed.

14. A centering gauge tool as recited in claim 13, wherein said stop means comprises an annular lip formed on said ring and disposed about said fingers.

15. A centering gauge tool as recited in claim 14, wherein each of said indicator means comprises illumination means.

16. A centering gauge tool for determining the concentricity of a bore about a central axis, said tool comprising a substantially conical core having an axis of elongation and a periphery tapering from a tail end to a leading end, a plurality of elongated fingers spaced apart about the periphery of said core, means for pivotably connecting said fingers to the core adjacent the leading end, resilient means for urging said fingers radially outwardly from the periphery of said core, stop means for limiting the radial outward travel of said fingers to the same radius relative to the axis of elongation of said core, normally open switch means associated with each finger adapted to be closed upon depression of the associated finger to overcome the urging of said resilient means, indicator means and a source of electrical energy connected in an electrical circuit with each of said switch means, said tail end of said core including means adjacent thereto defining a cylindrical member of smaller diameter than the diameter of said conical core at said tail end of said conical core, each of said fingers overlying said cylindrical member, and each of said switch means comprises at least one electrical contact fastened to said cylindrical member beneath a respective finger, whereby upon insertion of said tool within a bore of a diameter less than a diameter defined by the radial outward travel of said fingers adjacent the tail end and larger than the leading end of one or more of said indicator means will signal depression of the respective fingers upon engagement with the wall of the bore.

17. A centering gauge tool as recited in claim 16, wherein each finger includes an electrical contact engagable with a respective electrical contact of said cylindrical member.

18. A centering gauge tool as recited in claim 16, including an indicator ring fastened to the tail end of said core, said stop means comprising an annular lip formed on said ring and disposed about said cylindrical member and about said fingers.

19. A centering gauge tool as recited in claim 18, wherein said ring comprises means for mounting said indicator means and said source of electrical energy.

20. A centering gauge tool as recited in claim 19, wherein each of said indicator means comprises illumination means.

* * * * *